United States Patent [19]

Baciak

[11] Patent Number: 5,021,643
[45] Date of Patent: Jun. 4, 1991

[54] POINTER/TRACKER FOR A PHASED ARRAY LASER SYSTEM

[75] Inventor: Mark G. Baciak, West Melbourne, Fla.

[73] Assignee: The United States of America as represented by the Secretary of the Air Force, Washington, D.C.

[21] Appl. No.: 500,614

[22] Filed: Mar. 13, 1990

[51] Int. Cl.$^5$ ............................ G01J 1/20; G01B 11/26
[52] U.S. Cl. ............................ 250/201.9; 250/203.2; 356/152
[58] Field of Search ............ 250/201.9, 203.1, 550, 250/203.2; 356/141, 152, 5, 363

[56] References Cited

U.S. PATENT DOCUMENTS

| | | | |
|---|---|---|---|
| 3,346,738 | 10/1967 | Rogers et al. | 250/203 |
| 3,706,493 | 12/1972 | Redmann | 356/4 |
| 3,731,103 | 5/1973 | O'Meara | 250/203.2 |
| 3,790,277 | 2/1974 | Hogan | 356/152 |
| 4,467,186 | 8/1984 | Goralnick et al. | 250/201.9 |
| 4,600,308 | 7/1986 | Waite | 356/363 |
| 4,639,586 | 1/1987 | Fender et al. | 250/201 |
| 4,667,090 | 5/1987 | Carreras et al. | 250/201 |
| 4,684,796 | 8/1987 | Johnson | 250/201.9 |
| 4,689,758 | 8/1987 | Carreras | 364/561 |
| 4,950,880 | 8/1990 | Hayner | 250/201.9 |

Primary Examiner—David C. Nelms
Assistant Examiner—Michael Messinger
Attorney, Agent, or Firm—Donald J. Singer; Jacob N. Erlich

[57] ABSTRACT

A pointer/tracker system is disclosed for use with an array of laser telescopes. This pointer/tracker system uses one telescope as a reference and causes all others in the system to "track" the reference. The common element concept is maintained by a synthetic approach. Each tilt detector in the system has its own XY coordinate system relative to the detector orientation. Provisions were made in the Pointer/Tracker to align each independent coordinate system to the reference coordinate system. The technique used to accomplish this is allowing cross coupling of the XY coordinates to match that the reference.

7 Claims, 5 Drawing Sheets

INTERFEROGRAM IMAGED ON CCD CAMERA

POINTER/TRACKER FOR A PHASED ARRAY LASER SYSTEM

STATEMENT OF GOVERNMENT INTEREST

The invention described herein may be manufactured and used by or for the Government for governmental purposed without the payment of any royalty thereon.

BACKGROUND OF THE INVENTION

The present invention relates generally to optical laser telescopes, and more specifically to a pointer/tracker apparatus for optically phasing an array of multiple telescopes for use as a laser transmitter, and providing off-axis point of the array.

A synthetic aperture is formed when separate optical systems are combined to function as a single larger aperture. When an aperture is synthesized, independent optical systems are phased to form a common image field with resolution determined by the maximum dimension of the array and therefore exceeding that produced by any single element. By optically phasing an array of multiple telescopes, a synthetic aperture is formed which can achieve the performance of an equivalent sized, single laser transmitter.

Phased arrays are currently in use. The successful application of phasing an array of multiple telescopes into a synthetic aperture is the subject of the patent filed by Janet S. Fender et al, entitled "Optically Phased Laser Transmitter", in Air Force Invention No. 16,653 and U.S. Pat. No. 4,639,586, the disclosure of which is incorporated herein by reference. The apparatus of the Fender patent is a laser transmitter which optically phases the output of an array of multiple optical laser telescopes to achieve the performance of a single laser transmitter of equivalent size.

The Fender apparatus performs phase matching between pairs of laser beams using an array containing at least two optical telescopes which become useable as a laser transmitter when combined with an optical phase matching system consisting of: a collecting telescope, a detector array, two fold mirrors, analog-to-digital converter, microprocessor, and two sets of correcting mirrors.

The two optical telescopes are adjacent to each other, and transmit two separate outgoing laser beams which require phase matching. The original source of the two outgoing beams may be either: a single laser beam, which has been divided (monochromatic); or two separately transmitted polychromatic laser beams.

The sampling mirror is able to intercept samples of outgoing laser beams from the edges of both telescopes and focus them through the two fold mirrors to the detector array.

The detector array may be either a line scan or an area charge coupled device (CCD), which reads out the interference pattern. The microprocessor receives the interference pattern between samples of pairs of transmitted laser beams from the CCD camera, then performs a calculation of the difference in optical path lengths between the two beams which allows the laser transmitter to match the phase of the outgoing beams by adjusting the optical path lengths with the correcting mirrors.

Note that this application incorporates by reference a patent filed by Richard A. Carreras entitled "Microcomputer Controlled Image Processor" and described in Air Force Invention No. 16,652, and U.S. Pat. No. 4,689,758. Mr. Carreras provides a detailed apparatus and technique to calculate the optical phase difference for two signals from an interference pattern provided by the CCD camera. The Carreras system has been successfully used with the Fender et al system to determine the difference between two beams using one of a number of phase estimating algorithms.

Once an accurate estimate of the phase difference is determined, the estimated error is used to adjust the phase by the correcting mirrors which adjust the optical path lengths of the two outgoing beams.

The original tracker designed for the phased array implemented a concept of the common physical element. The theory was that low frequency drifts in electronics, optics, and mechanical components caused distortion of the point spread function in the far field pattern. It was felt that if the optics and electronics were common to all three telescopes that the long term distortion effects could be controlled. That was true to a point, but the tracker offered limited capability. Off axis pointing presented a new problem that was beyond the capability of the tracker. Additionally, the tracker required complicated electronic circuitry that was difficult to align and maintain. It also caused ambiguities and instabilities in the tilt control loops. Through experimentation it was found that a common element was needed for improved tilt control of each synthetic aperture As a result of this need, the invention of Mr. Carreras et al entitled "Synthetic Aperture Multi-Telescope Tracker Apparatus" was developed. This system is the subject of U.S. Pat. No. 4,667,090, the disclosure of which is incorporated herein by reference. While the Carreras et al system provides improved tilt control, it offers limited flexibility, particularly when all telescopes are forced to dynamically track a reference.

Another system which may be used for rapid optical phasing of optical devices using white light interferometry is disclosed in the patent application of Mark Baciak entitled "Method and Apparatus for Rapid Optical Phasing", U.S. application Ser. No. 857,621, the disclosure of which is incorporated herein by reference. The system of the Baciak reference includes a white light source, a beam splitter, a scanning mirror and a stationary reflective surface. The scanning mirror is moved in piston while reflected light is observed by an electro-optic sensor at a receiver. A nulled pattern has been previously established at the receiver. An electrical signal from the electro-optic sensor is mounted at an amplification and recording means to identify variations in reflected light intensity that are caused by white light fringes. White light fringes only occur at zero optical difference, i.e. when the scanning mirror and stationary reflective surface are in phase.

The Baciak reference is important because it discloses a method phasing a plurality of optical devices. The method comprises transmitting light through a beam splitter to a reference mirror and an optical device to be phased. Light reflected from the reference mirror and the optical device are recombined at the beam splitter and directed to a receiver. Light at the receiver is converted by an electro-optical sensor to an electrical signal which is transmitted to a detection and amplification means. The optical device is then moved along the path of light directed to it (i.e., in piston) from the beam splitter until a variation in light intensity at the receiver indicates that there is zero optical difference between the reference mirror and the optical device being tested.

The first optical device tested can then be considered a reference and this process repeated with other optical devices to be phased.

Another exemplary phase matching system is disclosed in U.S. Pat. No. 4,600,308 by T. Waite entitled "Phase-Matching Arrayed Telescopes with a Corner-Cube-Budge Metering Rod" the disclosure of which is incorporated herein by reference. The Waite system resembles that of Janet Fender in that it uses an optical trombone to optically adjust the phase of adjacent telescopes through changes in optical path lengths.

All of the references cited above demonstrate the interest in a relatively emerging technology and phased arrays of optical telescopes. The current trend of developments resemble a similar development in phased array radar systems experienced a decade ago. The present invention is believed to contribute to the current developments by providing a pointer/tracker control system, which allows multiple independent optical telescopes to be used as a phased array in a laser transmitter and which causes all telescopes to be steered together.

SUMMARY OF THE INVENTION

The present invention provides a means of optically phasing an array of multiple telescopes into a synthetic aperture, which may be dynamically steered together while maintaining individual telescope control. The system uses one telescope control path as a reference. This reference is then combined with with individual telescope controls thus causing the "slaved" telescope controls to "track" the reference movement.

One embodiment of the invention provides off axis pointing to an array of multiple telescope elements using: a central processor unit, a system of optical amplifiers and gain stages, sets of analog-to-digital converters, and sets of individual digital signal processors. The central processor unit determines operating system parameters and designates one set of the array as a reference to which all the other sets of the array are tied. Each array has an X and Y input to an analog-to-digital converter which applies a signal to its own individual microprocessor. The microprocessor is under the control of a central processor by way of a common switch arrangement and input/output circuits. One output from the microprocessor is applied to a digital-to-analog converter which in turn provides a signal to point the array in the direction in accordance with the reference array.

Injecting a signal in the reference telescope causes all telescopes to move the same as the reference. This system provides the necessary flexibility and capability to perform off axis pointing of a phased array system while increasing the performance of the tilt control loops.

Another embodiment of the invention is an analog pointer/tracker system. Like the digital system, the analog pointer/tracker receives pairs of X and Y tilt signals for each laser telescope to indicate the tilt of the output of the telescope with respect to an X and Y plane that is parallel with the face of the array. One particular telescope in the array is designated as the reference telescope. The analog pointer/tracker cross couples the X and Y tilt signals of each individual telescope with the X and Y tilt signals of the reference telescope, using a plurality of gain stages to produce a series of X and Y tilt error signals. The tilt error signals are used by a compensator to adjust the output of the individual telescopes so that they point and track in the same direction as the reference telescope.

It is an object of the present invention to provide an array of laser telescopes which operated collectively as a synthetic aperture, with a system which provides system off axis pointing.

It is another object of the present invention to steer a phased array of optical telescopes by selecting one telescope as a reference, sampling the reference, then forcing all telescopes to track the reference telescope.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is a pointer/tracker system which simplifies the ability to point a phased array system, be it laser or electronic based.

Figure 1:
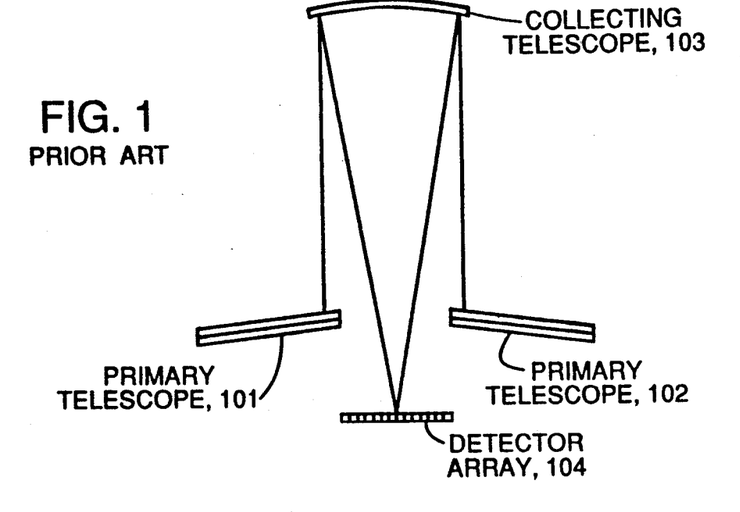
FIG. 1 is a sketch of the technique of a prior art phased array system as it applies to an array containing two primary telescopes.
Figure 2:
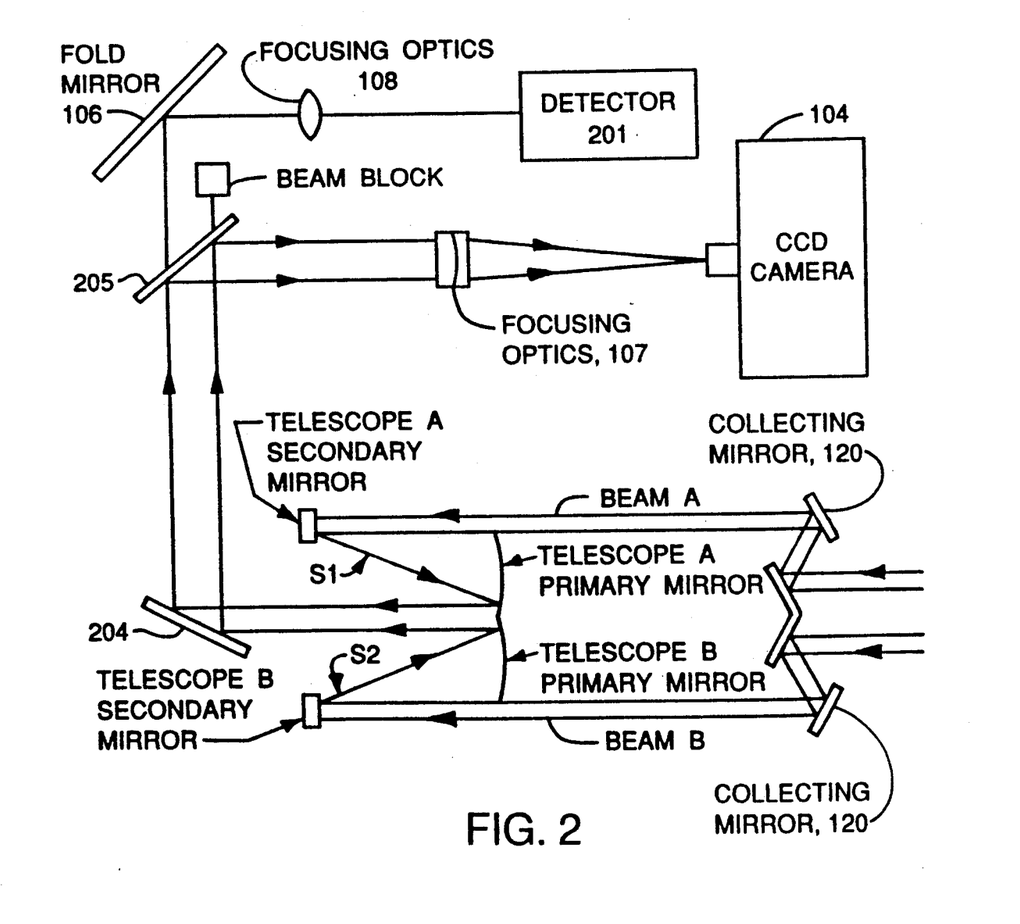
FIG. 2 is a sketch of the electro-optical sampling system which produces the X and Y signals for the system of FIGS. 5, 7 and 8.
Figure 3:
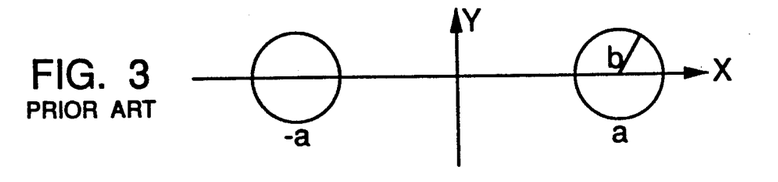
FIG. 3 is an illustration of the beam geometry of two samples.

FIGS. 1, 2 and 3 provide examples of a laser transmitter which uses a phased array of telescopes. FIGS. 1 and 3 are from the patent filed by Janet S. Fender et al, entitled "Optically Phased Laser Transmitter", discussed above.

The Fender apparatus performs phase matching between pairs of laser beams. The technique of the Fender invention, as it applied to an array consisting of only two primary telescopes, is illustrated in FIG. 1. The two primary telescopes 101 and 102 are transmitting telescopes, which are positioned very close to each other. The collecting telescope 103 (not drawn to scale) sits in front of the two transmitting telescopes 101 and 102 and bridges the gap between them. In this way, the collecting telescope 103 is able to intercept samples of outgoing laser beams from the edges of both primary telescopes and focus them on the detector array 104 where an interference pattern is created. The measurement of the interference pattern will be converted to digital and used to determine the phase difference between the two beams from the primary telescopes.

The system of FIG. 2 is the optical sampling system which intercepts a sample of a laser telescope 101 for the position detector 201. The system of FIG. 3 uses a sampling mirror 204 which intercepts a portion of the outgoing wavefront, and reflects it back through the beam splitter 205 through the focusing optics 108 onto the position detector 201. In the present application the position detector 201 outputs analog electrical signals indicative of the tilt of the beam with respect to an X and Y plane which is parallel with the surface of the telescope 101. The present invention was developed for use with a pointer/tracker system which controls an entire array of multiple laser telescopes. A brief summary of this use is discussed below.

FIG. 3 is an illustration of the beam geometry of the two samples of laser beams, which are brought to a common focus on the detector array 201 of FIG. 2. The two samples are separated by a distance of 2a at their centers, and each circular sample has radius b. If the laser beams exiting the telescopes are pointed in the same direction and focused to the same range, then the beam samples will focus to the same point creating an interference pattern which will be measured by the detector array. If the laser radiation consists of N different wavelengths λn; (n=1, 2 ... N), then the measured irradiance pattern will be the sum of the irradiances of the individual frequencies.

Let $I_n(r)$ denote the irradiance in the focal plane at the position $r=(x,y)$ and at the wavelength $\lambda_n$. Then:

$$I_n(r) = 2A_n b/r^2 J_1^2(k_n rb/F).$$

$$[1 + \cos(k_n(d + 2ax/f))] \quad (1)$$

here $A_n$ is the amplitude at wavelength $\lambda_n$ of the beam samples; $k_n = 2\pi/\lambda_n$; F is the focal length of the collecting optics; and d is the difference in the optical path lengths of the two transmitted beams.

Figure 4:
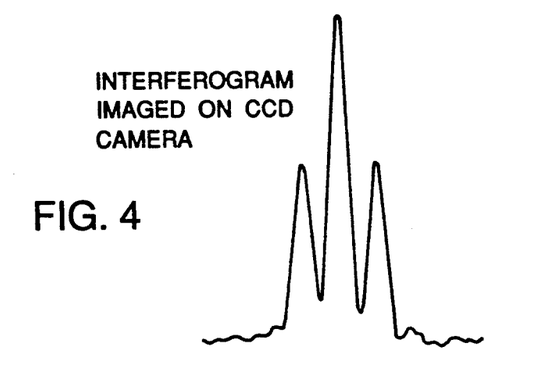
FIG. 4 is a chart of a interferogram imaged on the CCD camera of FIG. 2.

FIG. 4 is a sketch of an interferogram output of the CCD camera 104 of FIG. 2. This interferogram has a main peak and subsidiary peaks to the right and left of the main peak and represents the analog signal that is input into the Carreras reference cited above.

Figure 5:
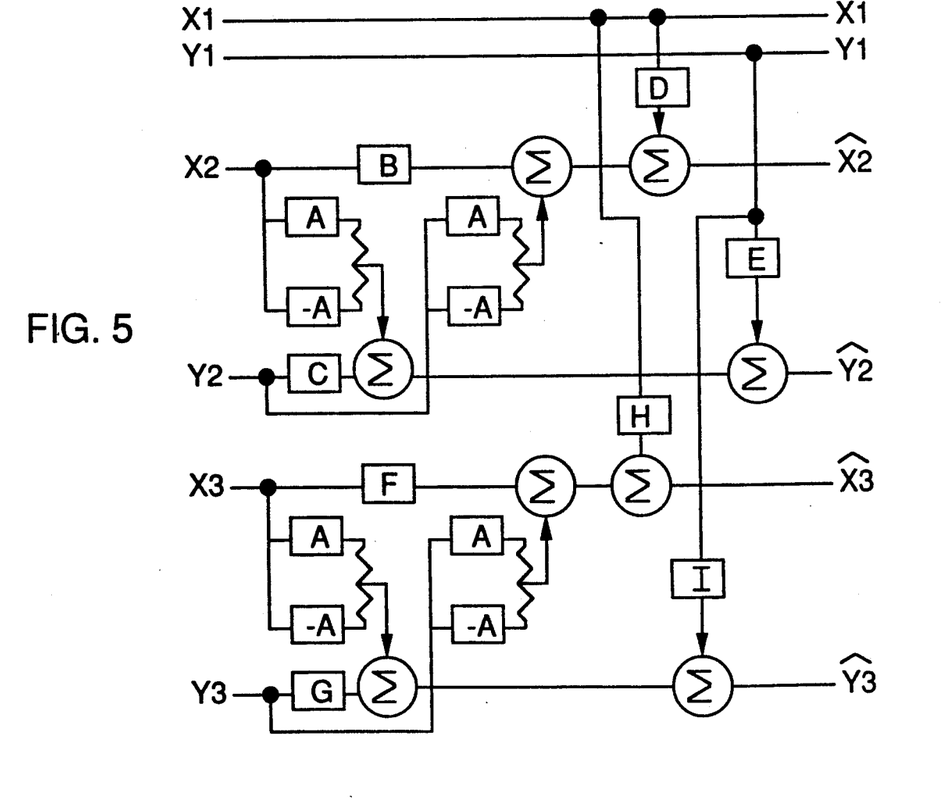
FIG. 5 is a block diagram of the analog pointer/tracker system of the present invention.

The reader's attention is now directed towards FIG. 5, which is a system block diagram of the analog pointer/tracker of the present invention for a three telescope phase array system. The pointer tracker receives three pairs of analog electrical signals respectively from three telescopes. These signals are identified as: X1, Y1, from a first telescope (which will serve as the reference telescope); X2, Y2, from a second telescope; and X3, Y3 from a third telescope.

Figure 6:
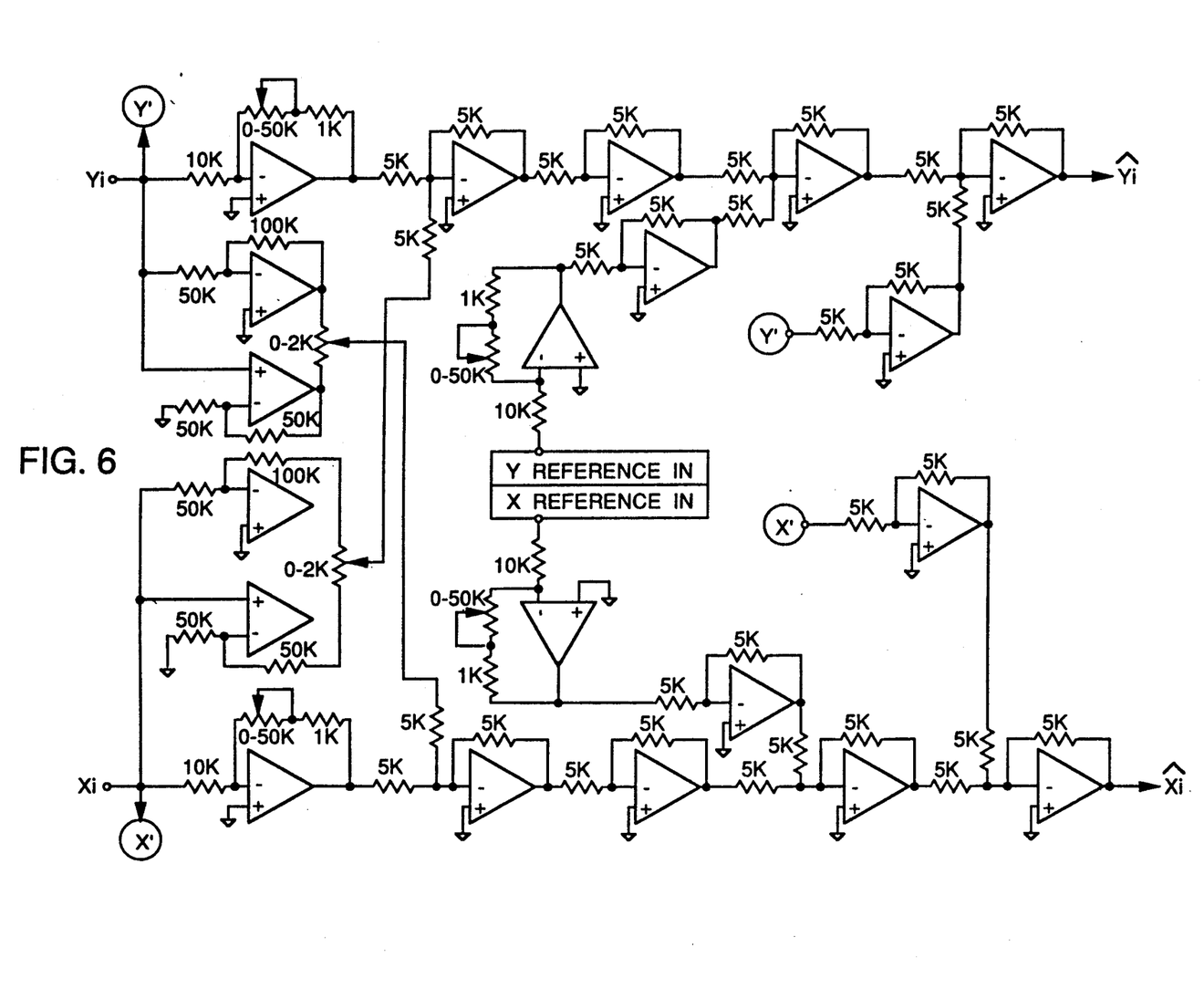
FIG. 6 is an electrical schematic of a stage of the analog pointer/tracker of FIG. 5 which supports an adjacent telescope.

The purpose of the system of FIG. 5 is to electrically adjust the outputs of the second and third telescopes so that they coincide with the reference. The details of FIG. 5 are discussed below, but first it is important to understand how the invention relates to standard phased array telescope systems. More specifically, the purpose of FIG. 6 is to provide a figure which illustrates where the electrical system of FIG. 5 receives the X and Y signals. Note that the source of the X and Y tilt position signals may also be either the digital position monitor of the above-cited Baciak DPM reference. However, in the interest of providing a complete description on how the present invention works, consider the following:

The Fender et al system samples two adjacent telescopes and uses the CCD camera/interferometer to obtain the electrical interferogram of FIG. 3. However, if a beam splitter is used on the sampled output of each telescope, then the CCD camera/position monitor 104 acts as a tilt detector with the output of electrical X and Y orientation signals. Each tilt detector in the system has its own coordinate system relative to the detector orientation. Provisions were made in the Pointer/Tracker to align each independent coordinate system to the reference coordinate system. The technique used to accomplish this is allowing cross coupling of the XY coordinates to match that of the reference. Note that there exists a commercially available UDT-431 position monitor that outputs an analog X and Y position.

Returning to FIG. 5, the analog point/tracker receives pairs of electrical X and Y signals from sampled laser telescopes which represent the orientation of the laser beams that they produce. In the system of FIG. 5, X1 Y1 are the reference signals, and X2, Y2, X3, Y3, are respectively received from the second and third telescopes (which are each sampled and processed by a system like that of FIG. 6). The object of the analog pointer/tracker of FIG. 5 is the electronically adjust the X2, Y2 and X3, Y3 signals so that they represent their tilt errors with respect to the X1, Y1 reference. This is accomplished with an electrical circuit which includes: a plurality of gain stages (demarked A, B, C, D, E, F, G, H and I) and eight summing junctions.

The output of the analog pointer/tracker of FIG. 5 includes: an unadjusted X1 and Y1 electrical analog signal and two pairs of tilt error correctional signals X2 Y2 and X3, Y3. The X1 and Y1 signals are unadjusted because they were selected as the reference, and all of the other telescopes are intended to be brought into phase alignment with them with optical path compensator systems.

Each of the gain stages of FIG. 5 are conventional operational amplifiers. The gain A is fixed at two. The wiper arm of the resistor proportions the amount of signal needed for matching coordinate systems. The gain stages B thru I are used to adjust for any optical differences in each path. As can be seen from the block diagram this system is simple and very easy to implement in analog or digital form. The analog version is a series of op amps to perform the amplification or summing functions. Again the analog version offers little flexibility to the system but it does provide a functional system that is easy to build and at a very low cost. An example of the gain of the amplifiers in one embodiment of the system of FIG. 5 is given below in Table 1.

TABLE 1

| Amplifier Gain Levels | |
|---|---|
| A = 2 | E = 0 |
| B = 0 | F = 1 |
| C = 1 | G = 1 |
| D = 1 | H = 1 |
| | I = 1 |

Output terminals electrically connected by a balance adjuster, the output of the gain stage pairs may be adjusted to a proportion of .heir input that can adjustably vary between +A and −A in the same manner that a potentiometer provides a variable resistance. Such balance adjusters are both commercially available, and well-known is that a further description of the need not be provided here.

As mentioned above, the output of the analog pointer/tracker of FIG. 5 includes an unadjusted X1 and Y1 electrical analog signal and two pairs of tilt error correctional signals X2 Y2 and X3 Y3. The X1 and Y1 signals are unadjusted because they were selected as the reference, and all of the other telescopes are intended to be brought into phase alignment with them with optical path compensator systems. Therefore the tilt error correctional signals X2, Y2 and X3, Y3 to compensators adjust the outputs of these telescopes so that they align with the reference. Such compensators are discussed in detail in the above-cited references, and operate by adjusting the optical path of the beams. The axis separator of the Carreras et al application Ser. No. 941,480, which is incorporated herein.

Each operational amplifier is a conventional electronic circuit. The gain of the amplifier is determined by a ratio of the feedback resistor divided by the input resistor. For a detailed electronic schematic of the analog pointer/tracker stage applied to a single telescope, see FIG. 7.

The values of the amplifier gain levels expressed in Table 1 are intended to serve as only an example of a configuration that actually has been used to dynamically steer the outputs of an array of laser telescopes so that they coincide with the reference telescope. In practicing the invention of FIG. 5, the actual gain must be determined empirically by beam-steering measurements to obtain the optimum choice of values for the gain levels of A-I. The theory of operation behind the analog pointer/tracker circuit of FIG. 5 is that the cause of the output of the individual laser telescope to match the direction of the reference. When the practice is followed for all of the individual laser telescopes in the array, the entire array may be dynamically steered by changes in the reference telescope since all of the individual laser telescopes will automatically point and track in the same direction as the reference telescope.

Tilt error signals $X_i$ and $Y_i$ for each laser telescope are composed of a combination of the X and Y reference signals plus the actual X and Y tilt signals produced by the laser telescope. As mentioned above, the X and Y tilt signals represent the tilt of the output of the laser telescope with respect to an X and Y plane that is parallel with the face of the array. The goal of the invention is to provide a measure of the X and Y tilt error, which is the difference between the tilt of the output of the reference telescope and output of the particular laser telescope being adjusted. However, in practice, merely taking a difference respectively between the X and Y reference signals and the X and Y tilt signals is an overly simplistic and inadequate approach with a phased array of telescopes. Successful off-axis pointing must also adjust for any optical differences in each path of the output of the laser telescopes. For this reason, the actual gain levels used in the amplifiers of FIG. 5 must be determined empirically by beam-steering measurements, in which the user selects different gain values and attempts to steer the individual laser telescope in the same direction as the reference. Once the values of the gain levels has been determined for a telescope these values will allow cross coupling of the XY coordinates to cause the output of the individual laser telescopes to match the direction of the reference telescope. When this practice is followed for all of the individual laser telescopes in the array, the entire array may be dynamically steered by changes in the reference telescope.

Note that the examples of the gain values listed above in Table 1 are intended to serve as just one example of a working pointer/tracker system as depicted in FIG. 5. For each array system of telescopes, the user would be advised that although the circuit of FIG. 5 may be used exactly as depicted, the actual values of the gain stages should be determined empirically for the best results for the telescope system being used. However, note that the system of FIG. 5 is designed to be adjustable. More specifically, a number of pairs of gain stages (designated as A and as $-A$) have their output terminals electrically connected by a balance adjuster. This provides an adjustable gain in the manner described below.

As mentioned above, a number of pairs of gain stages are designated as A and $-A$. Referring back to Table 1, this means that those gain stages designated as A provide a positive gain of the value of A to the signal it receives. Those gain stages designated as $-A$ emit their outputs on an inverting output terminal, and provide a gain of $-A$ to the signals they receive.

FIG. 6 is an electronic schematic of a circuit which would serve as a analog pointer/tracker for a single telescope which would condition its original output ($X_i$, $Y_i$) to coincide with the X and Y reference by outputting a correctional output $X_i Y_i$. The system of FIG. 6 would receive the electrical equivalent of the output of a laser telescope $X_i Y_i$ from a system such as that of FIG. 2 as well as the X and Y references from the reference laser. The output of FIG. 6 would be the tilt error correctional $X_i$ and $Y_i$ signals which are used by the compensators to adjust the optical paths of adjacent telescopes so that they will track with the reference telescope. The use of such compensators is discussed in the Carreras et al patent.

Figure 7:
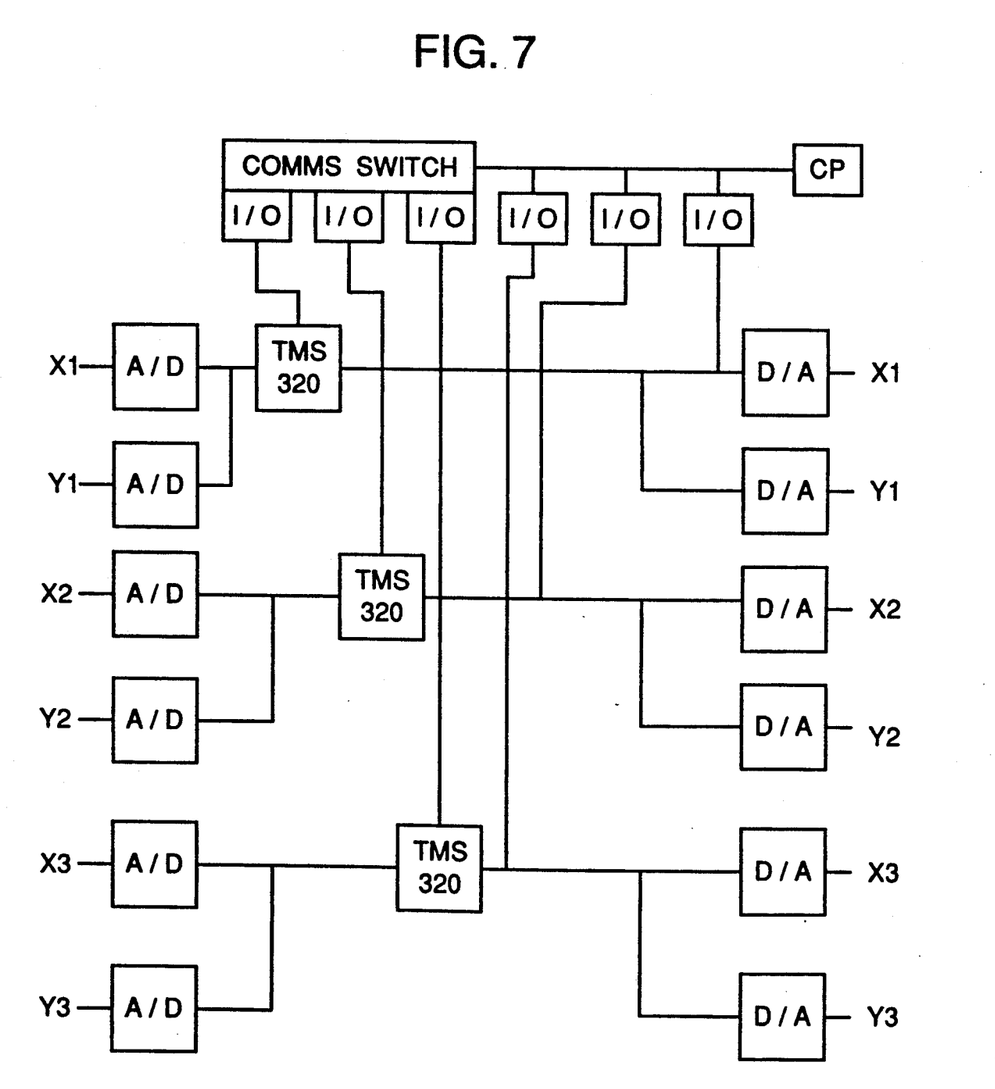
FIG. 7 is a block diagram of the digital pointer/tracker system of the present invention.

The reader's attention is now directed towards FIG. 7, which is a block diagram of a digital pointer/tracker system for a three telescope array. The system of FIG. 7 has digital control which gives it greater flexibility than the system of FIG. 5.

The system of FIG. 7 receives the X1 Y1, X2 Y2, and X3 Y3 analog electrical equivalent signals of the output of three laser telescopes in the same manner as the system of FIG. 5, using system like that of FIG. 2. Each of these X and Y signals are converted into their digital equivalent by analog-to-digital (A/D) converters as depicted in FIG. 7. The system of the FIG. 8 resembles that of FIG. 5 in that it uses one telescope as a reference and causes all others in the system to "track" the reference. The common element concept is maintained by a synthetic approach.

Figure 8:
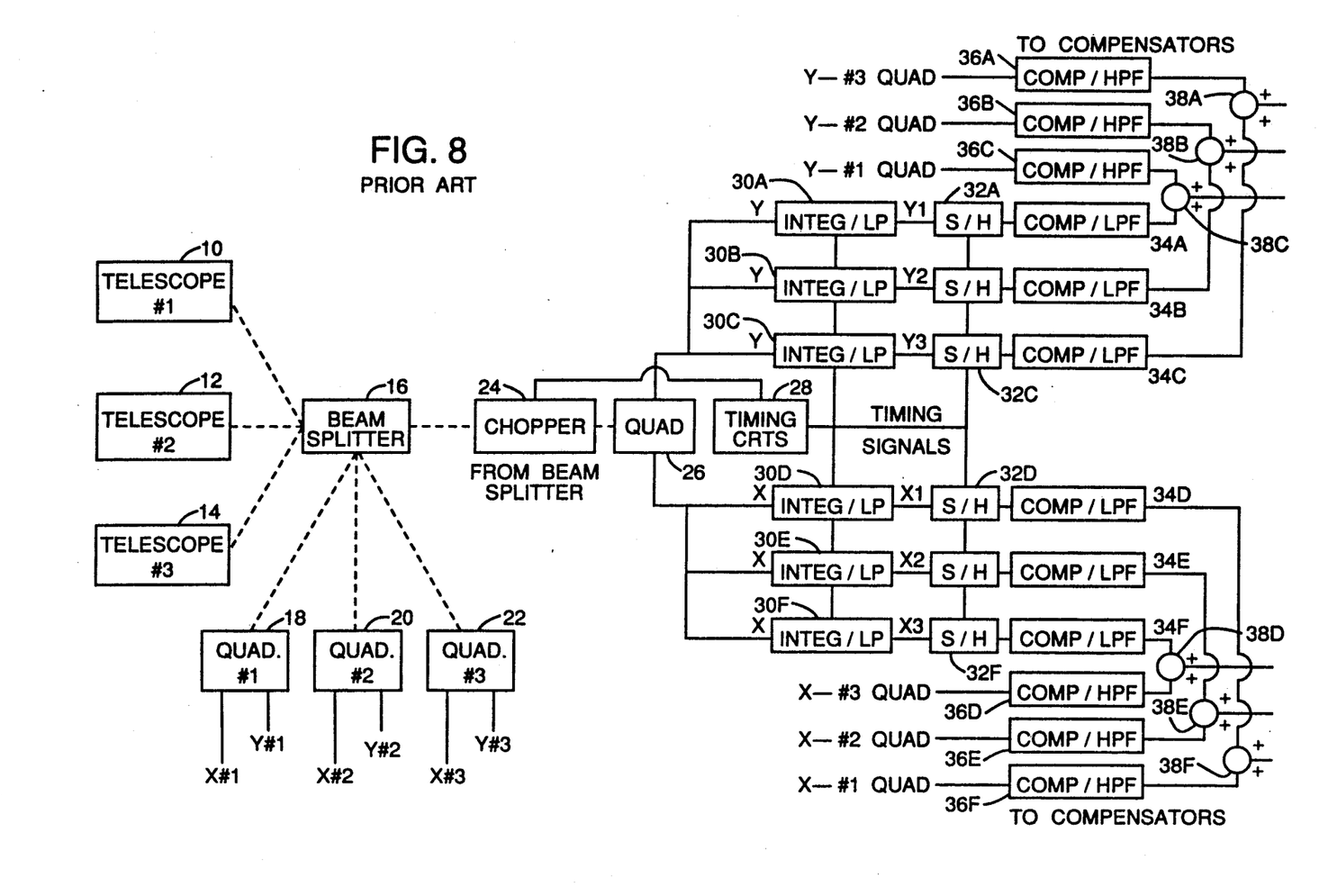
FIG. 8 is a sketch of the prior art tilt error system which is replaced by the present invention.

The digital equivalent of the X and Y pairs in FIG. 8 are each received by a TMS 320 digital signal processor, and forwarded through the input/output (I/O) connections through a common switch to the central processor.

The Central Processor (CP) determines operating system parameters and designates one set, X1 Y1 as a reference. It also establishes the communications switching network configuration to accomplish the communications paths for the TMS 320's, and outputs a digital equivalent of the unadjusted X1 and Y1 reference, along with the correctional tilt error signals X2 Y2 and X3 Y3. These tilt error correctional signals will be used by compensators to adjust the phase of adjacent telescopes to coincide with that of the reference element. The central processor derives these tilt error correctional signals using the pointer/tracker algorithm presented below.

With the digital system of FIG. 8, the algorithms implemented are as follows $$X_i = x_i(1+A) + By_i + Cx_{ref}$$

$$Y_i = y_i(1+D) + Ex_i + Fy_{ref}$$

The variables are different in each equation to allow compensation for detector, electronic, and optical differences. An analog version has been built and implemented. The experimental parameters for the AFWL Phased Array experiment are as follows, $A=1$ $B=0$ $C=1$ $D=1$ $E=0$ $F=1$. These settings produced excellent results. The factors B and E are due to our detector alignment technique which produced zero detected cross coupling. Alignment procedures will have to be tailored for individual applications. This system is a straightforward implementation and alignment procedures can be accomplished with little difficulty. The block diagram also shows the probable configuration for three telescope phased array system. It is obvious that this can be expanded to facilitate N telescopes. The TMS 320 shown on FIG. 7 are Texas Instruments TMS 320's. The reason they are shown is because of the 200 nsec instruction cycle time. This allows minimum execution time for the Pointer/Tracker Algorithm.

The gain values of A–F in the algorithms used by the TMS 320 are selected in the same manner that the values of the gain stages in Table 1 were determined for the system of FIG. 5, that is, they should be determined empirically by beam-steering measurements so that the X and Y tilt error signals are composed of a combination of the X and Y reference signals and the X and Y tilt signals. The values are selected to allow cross coupling of the XY coordinates to match that of the reference output signal of the reference telescope, in the manner described above for the system of FIG. 5.

Once the tilt error signals are determined, they are sued by compensators (like that of the Carreras reference) to adjust the optical path of the output of the laser telescope so that its directional output coincides with that of the reference. As mentioned above, a detailed example of such a compensator system is provided in the patent application of Carreras et al entitled "Axis Separator Electronic Translator" Ser. No. 941,480, which is incorporated herein by reference.

A digital implementation of the Pointer/Tracker provides flexibility and automatic alignment. The flexibility is inherent in the software, which lends itself nicely to the adaptive control system concept. For instance, if the chosen reference somehow became diabled, the digital control system could digitally change reference signals and choose a functional reference. Additionally, during the automatic alignment stage, the correction factors could be determined so each telescope in the system could be a reference. Then, when a change of reference needed to be initiated, all necessary parameters could be loaded into the main operating system. The automatic alignment software would then have the responsibility of determining gain factors for each "slave" telescope and the amount of cross coupling required to match the reference. This would be done for each telescope acting as the reference and all others slaved to it. The result would be a table of parameters for each telescope to be the reference. The digital system could be similar to the one shown in FIG. 7, as described above.

A suitable telescope control mechanism is one like that of the Fender et al patent, which receives tilt error correctional signals which are used to adjust the optical path difference adjusters (OPDA) of adjacent telescopes to bring then into coinciding phase with each other. The most recently developed system which interrelates with such compensator systems is the system of Carreras et al. (FIG. 8).

The Phased Array (PHASAR) experiment was originally designed as a proof of concept for phasing multi-element synthetic apertures. Through experimentation it was found that a common element was needed for improved tilt control of each synthetic aperture. As a result of this need, the Carreras et al invention entitled "Synthetic aperture Multi-telescope Tracker" was designed and built. This invention, however, offered little flexibility for a growing experiment because the original tracker designed for the phased array experiment implemented a concept of the common physical element. The theory was that low frequency drifts in electronics, optics, and mechanical components caused distortion of the point spread function in the far field pattern. It was felt that if the optics and electronics were common to all three telescopes that the long term distortion effects could be controlled. That was true to a point, but the tracker offered limited capability. Off axis pointing presented a new problem that was beyond the capability of the tracker. Additionally, the tracker required complicated electronic circuitry that was difficult to align and maintain. It also caused ambiguities and instabilities in the tilt control loops.

The pointer/tracker of the present invention provides flexibility and offers many advantages for experimental growth. Basically, this system synthetically provides a common element while maintaining individual telescope control. The system uses one telescope control path as a reference. This reference is then combined with the individual telescope controls thus causing the "slaved" telescope controls to "track" the reference movement. The off axis pointing capability was incorporated as discussed above. This is easily accomplished with the pointer/tracker since all telescopes are forced to track a reference.

The reader's attention is now directed towards FIG. 8, which is an illustration of the synthetic aperture multi-telescope tracker of the Carreras et al patent. Like the example of the present invention, the system of FIG. 10 controls an array of three telescopes 10, 12 and 14 which provide output signals to the beam splitter unit 16. The beam splitter unit 16 is arranged such that the output signal form the #1 telescope unit 10 is applied to the #1 dynamic quad sensor unit unit 18, the #2 telescope unit 12 to the #2 quad sensor unit unit 20, and the #3 telescope unit 14 to the #3 quad sensor unit 22. The quad sensor units 18, 20, 22 respectively convert the received optical signals into electrical signals which represent the telescope return signal offset in terms of X and Y of the displacement from the quad unit center. The output signals from the telescopes 10, 12, 14 pass through the beam splitter unit 16 to the chopper unit 24. The chopper unit 24 generates timing signals which are applied to the timing circuits unit 28. The chopper unit 24 utilizes a chopper wheel to provide sampled telescope output return signals to the quad unit 26. The output of the quad unit 26 comprises X and Y signals for each of the three sampled telescope output returns. These X and Y component signals are respectively applied to integrated/low pass filter units 30a–30f. Each output from the integrator/low pass filter units 30a–30f is appropriately designated Y1, Y2, Y3 to indicate the telescope of origin for the particular Y signal. THe same designation has been utilized with respect to the x signal wherein the outputs are respectively labelled X1, X2, and X3.

A plurality of sample and hold unit 32a–32f are respectively connected to the plurality of integrator/low pass filter units 30a-30f to receive the X and Y signals therefrom. Timing signals from the timing circuits unit 28 are applied to each unit of the plurality of integrator/low pass filter units 30a-30f and, the sample and hold units 32a-32f. A plurality of complementary low pass filters 34a-34f are respectively connected to the sample and hold units 32a-32f. In addition, a plurality of complementary high pass filters 36a-36f are respectively connected to receive the indicated input signal from the three quad units 18, 20, 22. It should be noted that the quad units 18, 20, 22 and 26 may each comprise a single photodetector cell that is divided by a suitable mask into four quad detector units. The quad sensor units of the present invention are well known and are commercially available. For example, one such suitable device is the UDT model 431 X-Y position indicator from United Detector Technology of Culver City, Calif. The output signal from the complementary low pass filters and the complementary high pass filter are combined in summing units 38a-38f respectively to provide an X and Y tilt error compensation signal for each telescope unit 10, 12, and 14. For example, the output signal from the complementary low pass filter unit 34a which represents the sampled y component from the #1 telescope unit 10 is combined with the output signal from the complementary high pass filter unit 36c to provide a total error tilt compensation signal for the #1 telescope unit 10. With respect to the X component for the #1 telescope unit 10, the same procedure is followed using the appropriate circuit units as shown in FIG. 8. The above procedure is utilized for the X-Y signal for each of the telescope units 10, 12, and 14.

The pointer/tracker of the present invention of both FIG. 5 and FIG. 8 provides the X and Y correctional signals that may be used by the telescope control system instead of the system of Carreras et al, as shown in FIG. 8. However, note that each of the three telescopes would be sampled by a system such as that of FIG. 2 to obtain their X Y analog electrical equivalents. Then these signals are processed in either the analog system of FIG. 5, or the digital system of FIG. 7 to provide the tilt error correctional signals that go to the same compensators used by the system of the Carreras et al reference of FIG. 8.

This system provides the necessary flexibility and capability to perform off axis pointing of a phased array system while increasing the performance of the tilt control loops. Injecting a signal in the reference telescope causes all telescopes to move the same as the reference. With this system off axis pointing has not only been achieved but also implemented very easily.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A pointer/tracker system for use with a photodetector system and an array of laser telescopes, each of which provide a laser output signal, said array of laser telescopes including a reference telescope which produces a reference output signal with a reference direction towards which all the other laser telescopes are to be dynamically steered by a compensator, said photodetector system receiving a sample of the laser output signals of the laser telescopes and outputs X and Y tilt signals corresponding to the tilt of the laser output signals with respect to an X and Y plane, said X and Y plane being parallel to said array, said pointer/tracker system receiving said X and Y tilt signals and outputting a plurality of X and Y tilt error signals for each of said laser telescopes in said array of laser telescopes to said compensator so that all of the outputs of the laser telescopes in said array of laser telescopes are dynamically pointed and steered in the same direction as that of the reference output signal of the reference telescope, said pointer/tracker system comprising:

a first and second set of reference terminals which are electrically connected between said photodetector system and said compensator to conduct an X reference signal and a Y reference signal for said reference telescope from said photodetector system to said compensator in an unchanged condition when the direction of the reference telescope is intended to be unchanged; and a plurality of first and second analog amplifier gain stages each of which are respectively electrically connected to said first and second set of reference terminals of said pointer/tracker system with said photodetector system such that each of said first analog amplifier gain stages receives a sample of said X reference signal and said X tilt signals for a selected laser telescope of said array of laser telescopes and outputs an X tilt error signal to said compensator to cause it to adjust the laser output of the selected laser telescope so that it is aligned in said X plane with the reference output signal, each of said second analog amplifier gain stages receiving a sample of said Y reference signal from said second reference terminal and said Y tilt signals for one of said laser telescopes, and outputting a Y tilt error signal to said compensator to cause it to adjust the laser output of the selected laser telescope so that it is aligned in said Y plane with said reference output signal.

2. A pointer/tracker system, as defined in claim 1, wherein each of said first analog amplifier gain stages comprises:

a first input terminal which receives an X tilt signal from said photodetector system;

a first input amplifier which produces an output by receiving and amplifying said X tilt signal from said first input terminal with a first gain;

a first pair of gain stage amplifiers which produce outputs by receiving and amplifying a Y tilt signal received from one of said second amplifier gain stages with a first adjustable gain;

a first summing junction which produces an output signal by receiving and combining the outputs of the first input amplifier and the first pair of gain stage amplifiers;

a second input amplifier which produces an output by receiving and amplifying said X reference signal from said first set of reference terminals with a second gain; and a second summing junction which outputs said X tilt error signal to said compensator by receiving and combining the outputs of said first summing junction with the output of said second input amplifier so that said X tilt error signal represents a combination of said X reference signal and said X tilt signal as adjusted by said first and second gains of said first and second input amplifiers.

3. A pointer/tracker system, as defined in claim 2, wherein each of said second analog amplifier gain stages comprises:
- a second input terminal which receives a Y tilt signal from said photodetector system;
- a third input amplifier which produces an output by receiving and amplifying said Y tilt signal from said second input terminal with a third gain;
- a second pair of gain stage amplifiers which produce outputs by receiving and amplifying an X tilt signal received from one of said first amplifier gain stages with a second adjustable gain;
- a third summing junction which produces an output signal by receiving and combining the outputs of the third input amplifier and the second pair of gain stage amplifiers;
- a fourth input amplifier which produces an output by receiving and amplifying said Y reference signal from said second set of reference terminals with a fourth gain; and
- a fourth summing junction which outputs said Y tilt error signal to said compensator by receiving and combining the outputs of said third summing junction with the output of said fourth input amplifier so that said Y tilt error signal represents a combination of said Y reference signal and said Y tilt signal as adjusted by said third and fourth gains of said third and fourth input amplifiers.

4. A pointer/tracker system, as defined in claim 3, wherein said first pair of amplifier gain stages comprises:
- a fifth input amplifier which produces an output by receiving and amplifying said Y tilt signal received from one of said second input terminals of one of said second analog amplifier gain stages with a fifth gain, said fifth gain having a positive value;
- a sixth input amplifier which produces an output by receiving and amplifying said Y tilt signal received from one of said second input terminals of one of said second analog amplifier gain stages with a sixth gain, said sixth gain having a negative value whose absolute value approximately equals the positive value of said fifth gain; and
- a balance adjuster which is electrically connected to said fifth and sixth input amplifiers, and which produces said output of said first pair of gain stage amplifiers with said first adjustable gain by providing adjustable decreases to the outputs of the fifth and sixth input amplifiers.

5. A pointer/tracker system, as defined in claim 4, wherein said second pair of amplifier gain stages comprises:
- a seventh input amplifier which produces an output by receiving and amplifying said X tilt signal received from one of said first input terminals of one of said first analog amplifier gain stages with a seventh gain, said seventh gain having a positive value;
- an eighth input amplifier which produces an output by receiving and amplifying said Y tilt signal received from one of said first input terminals of one of said first analog amplifier gain stages with an eighth gain, said eighth gain having a negative value whose absolute value approximately equals the positive value of said seventh gain; and
- a balance adjuster which is electrically connected to said seventh and eighth input amplifiers, and which produces said output of said first pair of gain stage amplifiers with said first adjustable gain by providing adjustable decreases to the outputs of the seventh and eighth input amplifiers.

6. A pointer/tracker system for use with a photodetector system and an array of laser telescopes, each of which provide a laser output signal, said array of laser telescopes including a reference telescope which produces a reference output signal with a reference direction towards which all the other laser telescopes are to be dynamically steered by a compensator, said photodetector system receiving a sample of the laser output signals of the laser telescopes and outputting X and Y reference signals corresponding to the tilt of the reference telescope with respect to said X and Y plane, said photodetector system outputting X and Y tilt signals corresponding to the tilt of the laser output signals with respect to said X and Y plane, said X and Y plane being parallel to said array, said pointer/tracker system receiving said X and Y tilt signals and outputting a plurality of X and Y tilt error signals for each of said laser telescopes in said array of laser telescopes to said compensator so that all of the outputs of the laser telescopes in said array of laser telescopes are dynamically pointed and steered in the same direction as that of the reference output signal of the reference telescope, said pointer/tracker system comprising:
- a plurality of pairs of analog-to-digital converters which are each electrically connected to said photodetector system to produce an output by receiving and converting into digital an X and Y tilt signal for one of said laser telescopes from said photodetector system, said pairs of analog-to-digital converters including an X reference analog-to-digital converter and a Y reference analog-to-digital converter which respectively receive and convert said X reference signal and said Y reference signal for said reference telescope from said photodetector system;
- a plurality of digital signal processors, each of which are electrically connected to one of said pairs of analog-to-digital converter pairs and to said X and Y reference analog-to-digital converters to receive their output signals, each of said digital signal processors outputting a digital X tilt error signal and a digital Y tilt error signal which, when converted into their analog equivalents, can be used by said compensator to direct one of said laser telescopes to point its laser output signal in the same direction as said reference laser telescope;
- a plurality of pairs of digital-to-analog converters which are each electrically connected to one of said digital signal processors and to said compensator, each of said pairs of digital-to-analog converters outputting a plurality of X and Y tilt error signals to said compensator by receiving and converting into analog said digital X tilt error signal and said digital Y tilt error signal from one of said digital signal processors; and
- a means for interfacing said plurality of pairs of analog-to-digital converters with said plurality of pairs of digital-to-analog converters, said interfacing means providing electrical connections therebetween.

7. A pointer/tracker system, as defined in claim 6, wherein each of said pairs of digital signal processors comprises:
- a first and second microprocessor which are connected to one of said pairs of analog-to-digital processors and to said reference X and Y analog-to-digital converters to respectively receive their outputs, including said digital X and Y tilt signal, and said X and Y reference signals, said first and second microprocessors respectively outputting said X and Y tilt error signals to one of said pairs of digital-to-analog converters by respectively calculating a measure of alignment required to tilt said laser telescope so that it is aligned in said X and Y plane with said reference telescope using a first and second algorithm comprising:

$Xi = Xi(1+A) + BYi + CX\ ref;$ and $Yi = Yi(1+D) + EXi + FY\ ref;$ where

Xi and Yi respectively denote said X and Y tilt error signals, and Xi and Yi respectively denote said X and Y tilt signals for a particular laser telescope;

X ref and Y ref respectively denote said X and Y reference signals, and A, B, C, D, E and F respectively denote constants which are empirically determined by beam-steering measurements for said array of laser telescopes such that said X and Y tilt error signals are composed of a combination of said X and Y reference signals and said X and Y tilt signals in a manner that is known to cause said compensator to direct the outputs of the laser telescope to be pointed in the same direction as that of the reference output signal of the reference telescope.

* * * * *